US009485785B2

(12) United States Patent
Kim et al.

(10) Patent No.: US 9,485,785 B2
(45) Date of Patent: Nov. 1, 2016

(54) APPARATUS AND METHOD FOR TRANSMITTING COEXISTENCE BEACON PROTOCOL PACKET IN COGNITIVE RADIO BASED WIRELESS COMMUNICATION SYSTEM

(75) Inventors: Sang-Bum Kim, Seoul (KR); Cheng Shan, Suwon-si (KR); Eun-Taek Lim, Suwon-si (KR); Ju-Yeon Song, Seoul (KR); Jung-Soo Woo, Suwon-si (KR); Geun-Ho Lee, Suwon-si (KR); Ho-Dong Kim, Gwacheon-si (KR); Yong-Ho Park, Cheonan-si (KR); Jae-Ik Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 12/502,840

(22) Filed: Jul. 14, 2009

(65) Prior Publication Data

US 2010/0008297 A1 Jan. 14, 2010

(30) Foreign Application Priority Data

| Jul. 14, 2008 | (KR) | 10-2008-0068296 |
| Aug. 14, 2008 | (KR) | 10-2008-0079790 |
| Oct. 22, 2008 | (KR) | 10-2008-0103433 |

(51) Int. Cl.

| H04W 72/04 | (2009.01) |
| H04W 4/00 | (2009.01) |
| H04W 72/14 | (2009.01) |
| H04L 12/413 | (2006.01) |
| H04W 74/08 | (2009.01) |
| H04W 16/16 | (2009.01) |
| H04W 16/14 | (2009.01) |

(52) U.S. Cl.
CPC ......... H04W 74/0816 (2013.01); H04W 16/14 (2013.01); H04W 16/16 (2013.01); H04W 74/0825 (2013.01)

(58) Field of Classification Search
USPC ........ 370/328, 329–330, 447–448, 252, 445, 370/338, 346
See application file for complete search history.

(56) References Cited

U.S. PATENT DOCUMENTS 7,634,285 B2 * 12/2009 Hsu et al. ..................... 455/509
8,036,167 B2 * 10/2011 Litzinger .......... H04W 74/0816
370/329

(Continued)

FOREIGN PATENT DOCUMENTS

CN 1856963 A 11/2006
CN 101141755 A 3/2008

(Continued)

*Primary Examiner* — Candal Elpenord
(74) *Attorney, Agent, or Firm* — Jefferson IP Law, LLP

(57) ABSTRACT

A method of and apparatus for operating a Coexistence Beacon Protocol (CBP) packet transmitter in a Cognitive Radio (CR)-based wireless communication system is provided. The method includes, identifying a Self-Coexistence Window (SCW) regular pattern of neighbor Wireless Regional Area Networks (WRANs), if vacant SCW slots are not periodically occurring, selecting a WRAN as a contender among the neighbor WRANs, performing a contention for transmitting the CBP packet with the contender within SCW slots that are occupied by the WRAN, and configuring an SCW usage pattern so that an SCW usage period of the CBP packet sender is double that of an SCW usage period of the contender when winning in the contention.

22 Claims, 13 Drawing Sheets

(56) References Cited

U.S. PATENT DOCUMENTS

| | | | |
|---|---|---|---|
| 2003/0012167 A1 | 1/2003 | Benveniste | |
| 2003/0186713 A1 | 10/2003 | Sugaya et al. | |
| 2004/0008614 A1 | 1/2004 | Matsuoka et al. | |
| 2007/0058665 A1* | 3/2007 | Ho | H04L 12/403 370/447 |
| 2008/0095195 A1* | 4/2008 | Ahmadi et al. | 370/478 |
| 2008/0253341 A1* | 10/2008 | Cordeiro et al. | 370/338 |
| 2008/0285525 A1* | 11/2008 | Hu | H04W 72/1278 370/337 |
| 2008/0298310 A1* | 12/2008 | Hu | H04W 16/14 370/328 |
| 2008/0298329 A1* | 12/2008 | Mo et al. | 370/338 |
| 2010/0226358 A1* | 9/2010 | Cordeiro | H04W 72/082 370/350 |

FOREIGN PATENT DOCUMENTS

| | | |
|---|---|---|
| EP | 1 936 838 A2 | 6/2008 |
| JP | 2005-518760 A | 6/2005 |
| KR | 10-2006-0107544 A | 10/2006 |
| KR | 10-2008-0056160 A | 6/2008 |
| RU | 2 263 399 C2 | 10/2005 |
| WO | 01/50795 A1 | 7/2001 |
| WO | 2007/127250 A2 | 11/2007 |
| WO | 2008/061044 A2 | 5/2008 |

* cited by examiner n : SCW SLOT USED BY WRAN-N

: VACANT SCW SLOT

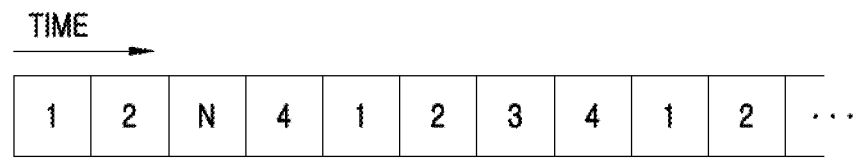
FIG.4A
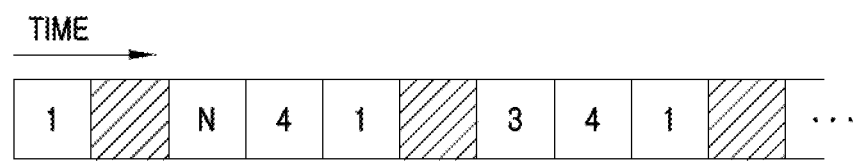
FIG.4B
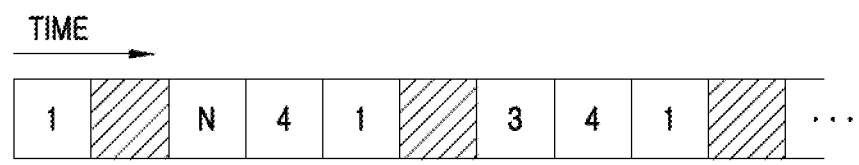
FIG.4C
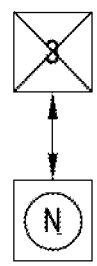
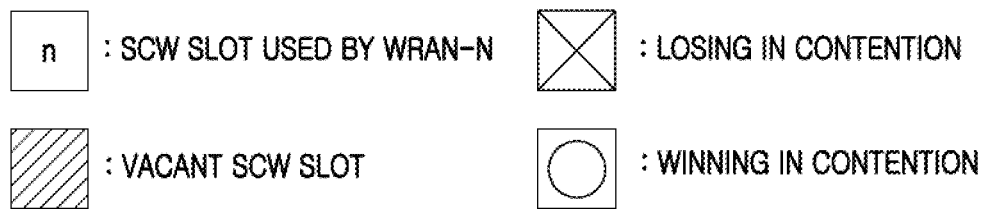

| n | : SCW SLOT USED BY WRAN-N |
| ▨ | : VACANT SCW SLOT |

APPARATUS AND METHOD FOR TRANSMITTING COEXISTENCE BEACON PROTOCOL PACKET IN COGNITIVE RADIO BASED WIRELESS COMMUNICATION SYSTEM

PRIORITY

The present application claims the benefit under 35 U.S.C. §119(a) of a Korean patent application filed in the Korean Intellectual Property Office on Jul. 14, 2008 and assigned Serial No. 10-2008-0068296, a Korean patent application filed in the Korean Intellectual Property Office on Aug. 14, 2008 and assigned Serial No. 10-2008-0079790 and a Korean patent application filed in the Korean Intellectual Property Office on Oct. 22, 2008 and assigned Serial No. 10-2008-00103433, the entire disclosures of all of which are hereby incorporated by reference.

BACKGROUND OF THE INVENTION

1. Field of the Invention

The present invention relates to a Cognitive Radio (CR)-based broadband wireless communication system. More particularly, the present invention relates to an apparatus and method for transmitting a Coexistence Beacon Protocol (CBP) packet in a CR-based wireless communication system.

2. Description of the Related Art

Developments in wireless communications have led to a situation where several types of communication systems coexist. Examples of the systems include a wireless communication system using a Code Division Multiple Access (CDMA) scheme referred to as a $2^{nd}$ generation technique, a wireless communication system using an International Mobile Telecommunications (IMT)-2000 scheme referred to as a $3^{rd}$ generation technique, and a system using an Orthogonal Frequency Division Multiple (OFDM) access scheme referred to as a $4^{th}$ generation technique. In this situation, the coexisting systems use different communication schemes and provide services by using different frequency bands. However, since limited frequency resources are used for wireless communication, there is a problem in that the frequency resources are not enough to allow coexistence of a large number of systems.

Accordingly, there is ongoing research on a Cognitive Radio (CR) technique which uses a temporarily unused frequency band (or channel) among pre-allocated frequency bands in use. That is, even if a system is licensed for the use of a specific frequency band, the entire band is not always used. Therefore, the CR-based wireless communication system searches for a channel temporarily unused by a licensed system, and then provides a service through the found channel to User Equipments (UEs) within a service area. For example, temporarily unused frequency bands can be used among frequency bands allocated for transmission of a TeleVision (TV) signal.

When the wireless communication system uses the CR technique, Base Stations (BSs) that manage their respective cells have to share communication information for other BSs in order to effectively share frequency resources. For this, in the CR-based wireless communication system, BSs use a synchronized Self-Coexistence Window (SCW) slot to transmit a Coexistence Beacon Protocol (CBP) packet including their communication information to neighbor BSs, and the neighbor BSs share the communication information by receiving the CBP packet. The SCW slot is located in a predefined position in every frame. The CBP packet includes a variety of information related to a self-coexistence algorithm, for example, a location of a corresponding BS, a sensing result, scheduling information, a backup channel list, etc.

As described above, in the CR-based wireless communication system, BSs use an SCW to share information necessary for each cell by transmitting and receiving a CBP packet. However, since the SCW is a resource whose amount is limited, collision occurs when a plurality of BSs transmit the CBP packet. If the BSs fail to correctly receive the CBP packet from the neighbor BSs due to the collision in the transmission of the CBP packet, a system operation cannot be properly managed. Accordingly, there is a need for a method of transmitting and receiving the CBP packet without collision or errors to properly operate the CR-based wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for avoiding collision in transmission of a Coexistence Beacon Protocol (CBP) packet in a Cognitive Radio (CR)-based wireless communication system.

Another aspect of the present invention is to provide an apparatus and method for selecting a proper contender by identifying a Self-Coexistence Window (SCW) regular pattern of a neighbor Wireless Regional Area Network (WRAN) in a CR-based wireless communication system.

Another aspect of the present invention is to provide an apparatus and method for sharing an SCW slot through contention in a CR-based wireless communication system.

Another aspect of the present invention is to provide an apparatus and method for increasing an SCW usage period to share an SCW slot by WRANs participating in contention in a CR-based wireless communication system.

In accordance with an aspect of the present invention, a method of operating a CBP packet sender in a CR-based wireless communication system is provided. The method includes identifying a SCW regular pattern of neighbor WRANs, if vacant SCW slots are not periodically occurring, selecting a WRAN as a contender among the neighbor WRANs, performing a contention for transmitting the CBP packet with the contender within SCW slots that are occupied by the WRAN, and configuring an SCW usage pattern so that an SCW usage period of the CBP packet sender is double that of an SCW usage period of the contender when the contention is won.

In accordance with another aspect of the present invention, an apparatus for transmitting a CBP packet in a CR-based wireless communication system is provided. The apparatus includes, an analyzer for identifying an SCW regular pattern of neighbor WRANs, a selector, if vacant SCW slots are not periodically occurring, for selecting a WRAN as a contender among the neighbor WRANs, and a controller for performing a contention for transmitting the CBP packet with the contender within SCW slots that are occupied by the WRAN, and for configuring an SCW usage pattern so that an SCW usage period of the CBP packet sender is double that of an SCW usage period of the contender when the contention is won.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 4A to 4F illustrate a process of changing an SCW usage period when a WRAN is released in a CR-based broadband wireless communication system according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
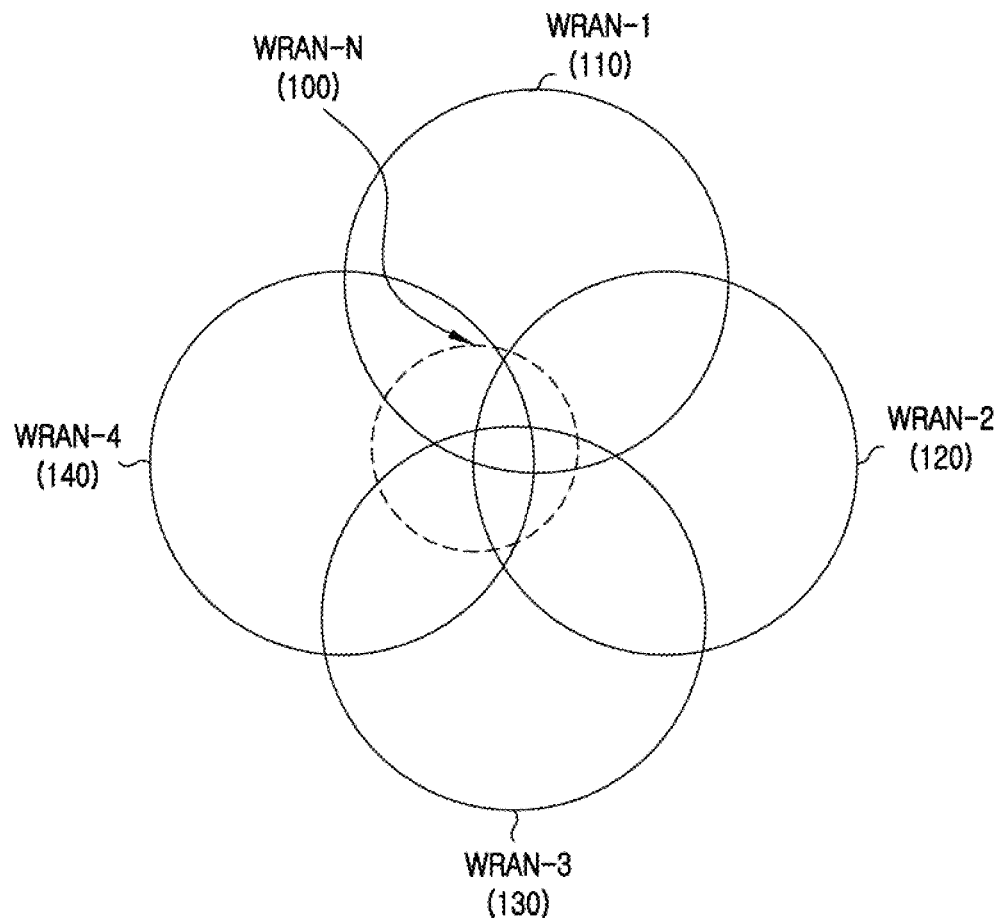
FIG. 1 illustrates an example of a newly accessing Wireless Regional Area Network (WRAN) in a Cognitive Radio (CR)-based broadband wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to a technique for avoiding collision in transmission of a Coexistence Beacon Protocol (CBP) packet in a Cognitive Radio (CR)-based wireless communication system. Although an Orthogonal Frequency Division Multiplexing (OFDM)/Orthogonal Frequency Division Multiple Access (OFDMA)-based wireless communication system will be described hereinafter as an example, the present invention can equally apply to other types of wireless communication systems.

In a CR-based wireless communication system, a CBP packet can be transmitted by not only a Base Station (BS), but also a User Equipment (UE). In other words, the UE can transmit the CBP packet under the control of a serving BS. In addition, the CBP packet can be received by not only the BS but also the UE, and the UE delivers the received CBP packet to the serving BS. That is, when the CBP packet is transmitted and received, the BS and UEs existing in a cell of the BS operate as if they are one entity. In other words, a logical entity for transmitting/receiving the CBP packet is not one node (e.g., BS, UE, etc.) but a Wireless Regional Area Network (WRAN) including all UEs existing in the cell of the BS. For convenience of explanation, the WRAN will be regarded as one entity in the following description of exemplary embodiments of the present invention.

In the CR-based wireless communication system of exemplary embodiments of the present invention, if necessary, a WRAN ensures its Self-Coexistence Window (SCW) usage pattern through contention with a neighbor WRAN. If the WRAN loses in the contention, the WRAN re-attempts contention in another SCW slot. Otherwise, if the WRAN wins in the contention, a WRAN which has lost in the contention doubles its SCW usage period and shares an SCW slot with the WRAN which has won in the contention.

The 'SCW usage pattern' denotes a usage type of an SCW slot in one WRAN, and includes both a usage period of the SCW slot and an offset of the SCW slot in use. In the following description, an 'SCW regular pattern' denotes a usage type of an SCW slot in a WRAN group, and is an aggregation of all SCW usage patterns of respective WRANs belonging to one group.

A method of using an SCW according to an exemplary embodiment of the present invention will be described in more detail below with reference to FIG. 1.

FIG. 1 illustrates an example of newly accessing a WRAN in a CR-based broadband wireless communication system according to an exemplary embodiment of the present invention.

Referring to FIG. 1, a WRAN-1 110, a WRAN-2 120, a WRAN-3 130, and a WRAN-4 140 are adjacent to one another and perform communication through a channel A located in the same frequency band. In this state, a WRAN-N 100 newly accesses the channel A. The new access occurs when the channel is changed or when a device transitions from a power-off state to a power-on state or when the channel is newly installed.

The WRAN-N 100 newly accessing the channel A monitors CBP packets transmitted from the neighbor WRANS 110, 120, 130, and 140. That is, the WRAN-N 100 receives a CBP packet from each SCW, and determines which WRANs transmit the CBP packets. Then, the WRAN-N 100 identifies an SCW regular pattern of the neighbor WRANs 110, 120, 130, and 140. In other words, the WRAN-N 100 determines when each of the neighbor WRANs 110, 120, 130, and 140 uses an SCW.

Figure 2A:
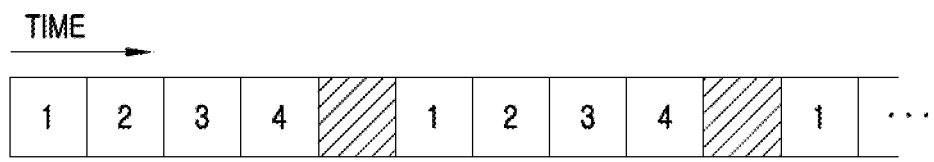
FIGS. 2A and 2B illustrate an example of a result of identifying neighbor WRANs by a newly accessing WRAN in a CR-based broadband wireless communication system according to an exemplary embodiment of the present invention.
Figure 2B:
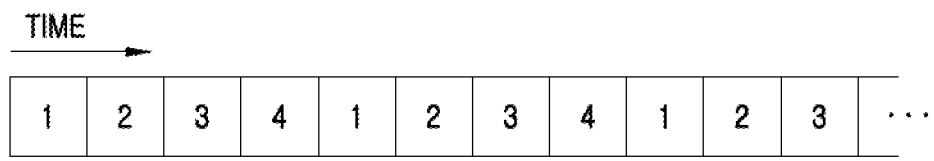

FIGS. 2A and 2B illustrate an example of a result of identifying neighbor WRANs by a newly accessing WRAN in a CR-based broadband wireless communication system according to an exemplary embodiment of the present invention. FIGS. 2A and 2B will be described in the context of the example described above with respect to FIG. 1.

If an analysis result shows that vacant SCW slots are periodically occurring as illustrated in FIG. 2A, the WRAN-N 100 configures an SCW usage pattern so that its SCW usage period coincides with an occurrence period of the vacant SCW slot, and transmits a CBP packet according to the configured SCW usage pattern. In this case, as illustrated in FIG. 2A, each of the WRAN-1 100 to WRAN-4 140 occupies one SCW slot in every 5 SCW slots, and thus the SCW usage period is 5. Therefore, the WRAN-1 100 can use the vacant SCW slot to transmit the CBP packet according to the SCW usage period of 5 SCW slots. On the other hand, as illustrated in FIG. 2B, if all SCW slots are used by the neighbor WRANs 110, 120, 130, and 140, the WRAN-N 100 attempts to obtain an SCW slot through contention with a WRAN having a shortest SCW usage period. When winning in the contention, the WRAN-N 100 configures an SCW usage pattern so that its SCW usage period is double that of an SCW usage period of its contender. A WRAN which has lost in the contention doubles its SCW usage period.

A process of obtaining an SCW slot through contention will be described in detail with reference to FIG. 3.

Figure 3:
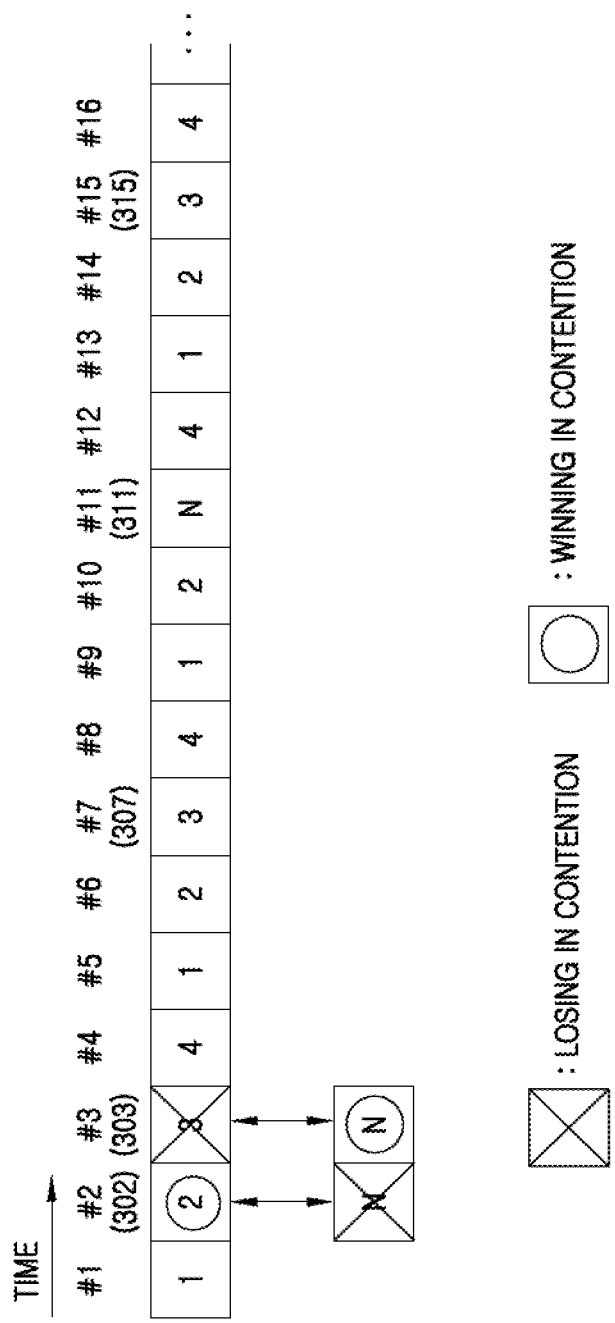
FIG. 3 illustrates an example of obtaining a Self-Coexistence Window (SCW) slot in a CR-based broadband wireless communication system according to an exemplary embodiment of the present invention.

FIG. 3 illustrates an example of obtaining an SCW slot in a CR-based broadband wireless communication system according to an exemplary embodiment of the present invention. FIG. 3 will be described in the context of the examples described above with respect to FIGS. 1, 2A and 2B.

The neighbor WRANs 110, 120, 130, and 140 use the same SCW usage period. The WRAN-N 100 selects the WRAN-2 120 as a contender. Subsequently, in an SCW slot #2 302, the WRAN-N 100 competes with the WRAN-2 120 for CBP packet transmission. In this case, the WRAN-N 100 loses in the contention with the WRAN-2 120. After losing the contention, the WRAN-N 100 reselects its contender. If the WRAN-2 120 is reselected, the WRAN-N 100 can compete again with the WRAN-2 120 at a next period. In this case, the WRAN-N 100 reselects the WRAN-3 130 as its contender. In an SCW slot #3 303, the WRAN-N 100 competes with the WRAN-3 130 for CBP packet transmission. In this case, the WRAN-N 100 wins in the contention with the WRAN-3 130, and thus uses the SCW slot #3 303 to transmit a CBP packet. Accordingly, the WRAN-3 130 doubles an SCW usage period, and the WRAN-N 100 configures the SCW usage pattern so that its SCW usage period is double that of a previous SCW usage period of the WRAN-3 130. In other words, the WRAN-N 100 and the WRAN-3 130 set the SCW usage period to 8 SCW slots. As a result, the WRAN-N 100 uses an SCW slot #11 311 to transmit the CBP packet according to the period, and the WRAN-3 130 uses an SCW slot #7 307 and an SCW slot #15 315 to transmit the CBP packet according to the period. Consequently, the WRAN-N 100 and the WRAN-3 130 share SCW slots occupied by the WRAN-3 130.

After a condition is set as illustrated in FIG. 3, a WRAN which has occupied an SCW slot may be released. That is, one of the WRAN-1 110, the WRAN-2 120, the WRAN-3 130, the WRAN-4 140, and the WRAN-N 100 may stop its operation, or an operating channel may be changed to another channel.

In this case, vacant SCW slots may occur with the same period as a period occupied by the released WRAN. Upon generation of the vacant SCW slots, WRANs currently using a corresponding channel intend to shorten their SCW usage periods by using the vacant SCW slots. In this case, to avoid a situation where a plurality of WRANs occupy the vacant SCW slots, the WRANs intending to occupy the vacant SCW slots return SCW slots occupied by themselves. In other words, from the perspective of a newly accessing WRAN, the WRANs compete to occupy the vacant SCW slots that occur due to the released WRAN. Due to the returning of the SCW slot, the WRANs are expected to attempt to occupy the vacant SCW slots. However, there is a situation where a vacant SCW slot can be additionally occupied without the returning of the SCW slot. Such a situation occurs when a vacant SCW slot is located in a center of previously occupied SCW slots. In other words, when one periodic SCW slot is configured by combining previously occupied SCW slots with vacant SCW slots, it is possible to add a vacant SCW slot without having to return an SCW slot. An attempt to occupy the vacant SCW slots is performed by the same contention as described with reference to FIG. 3 above. Unlike in the newly accessing WRAN, a WRAN which has lost in the contention cannot reattempt contention. This is because persistent contention attempts may impair a basic rule for SCW sharing.

Figure 4D:
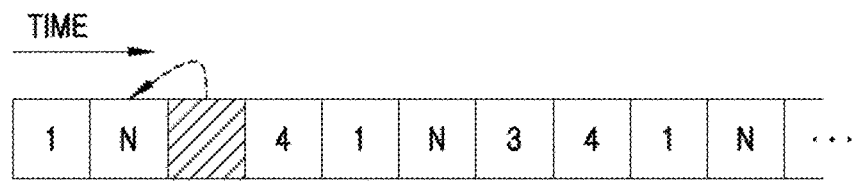
Figure 4E:
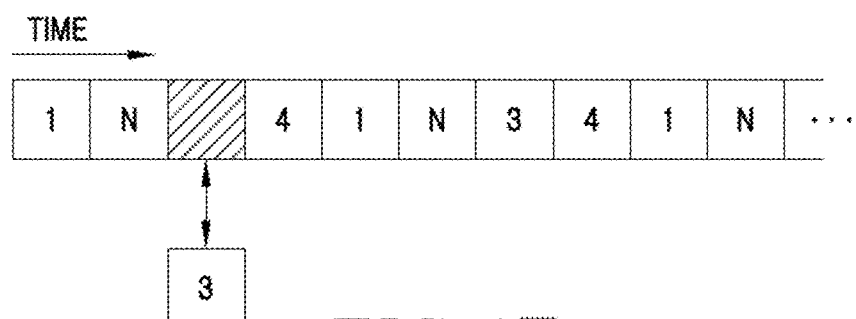
Figure 4F:
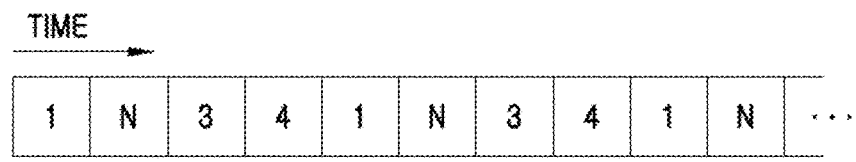

FIGS. 4A to 4F illustrate a process of changing an SCW usage period when a WRAN is released in a CR-based broadband wireless communication system according to an exemplary embodiment of the present invention. FIGS. 4A to 4F will be described in the context of the examples described above with respect to FIGS. 1, 2A, 2B and 3 and a situation where the WRAN-2 120 has been released. As illustrated in FIG. 4A, the WRAN-1 110, the WRAN-2 120, and the WRAN-4 140 use SCW slots with a period of 4 SCW slots, and the WRAN-3 130 and the WRAN-N 100 use SCW slots with a period of 8 SCW slots. In this case, if the WRAN-2 120 is released, as illustrated in FIG. 4B, vacant SCW slots occur with the same period as the SCW usage period of the WRAN-2 120. The WRAN-3 130 and the WRAN-N 100 have an SCW usage period of 8 SCW slots, which is longer than the period of the WRAN-1 110 and the WRAN-4 140, and thus intend to reduce their SCW usage periods. Vacant SCW slots as illustrated in FIG. 4B allow a CBP packet to be transmitted with a period of 4 SCW slots. Accordingly, the WRAN-3 130 and the WRAN-N 100 attempt contention to occupy the vacant SCW slots. In this case, as illustrated in FIG. 4C, the WRAN-N 100 wins in the contention. Then, the WRAN-N 100 is no longer able to occupy SCW slots occupied by itself. Accordingly, as illustrated in FIG. 4D, the WRAN-N 100 releases the SCW slots occupied by itself, and uses SCW slots obtained by winning the contention. As a result, vacant SCW slots with the same period as the previous period of the WRAN-N 100 newly occur. In this case, the newly occurring vacant SCW slots are located in a center of slots occupied by the WRAN-3 130. This is because the WRAN-N 100 has occupied half of SCW slots occupied by the WRAN-3 130 through contention. This situation occurs in an exemplary embodiment in which the WRANs regulate an SCW usage period by an interval of an exponent of 2 as a result of SCW slot contention. Therefore, when the WRAN-3 130 additionally occupies the newly occurring vacant SCW slots, it is possible to halve an SCW usage period together with the previously occupied slots. In this case, the previously occupied slots are not returned, and thus, as illustrated in FIG. 4E, the WRAN-3 130 additionally occupies the vacant SCW slots without returning the SCW slot. In case of FIG. 4F, since there is no other contender, the WRAN-3 130 obtains the SCW slots, and halves again the SCW usage period. Consequently, due to the release of as the WRAN-2 120, the SCW usage period of the WRAN-3 130 and the WRAN-N 100 is shortened from 8 to 4 SCW slots.

Figure 5:
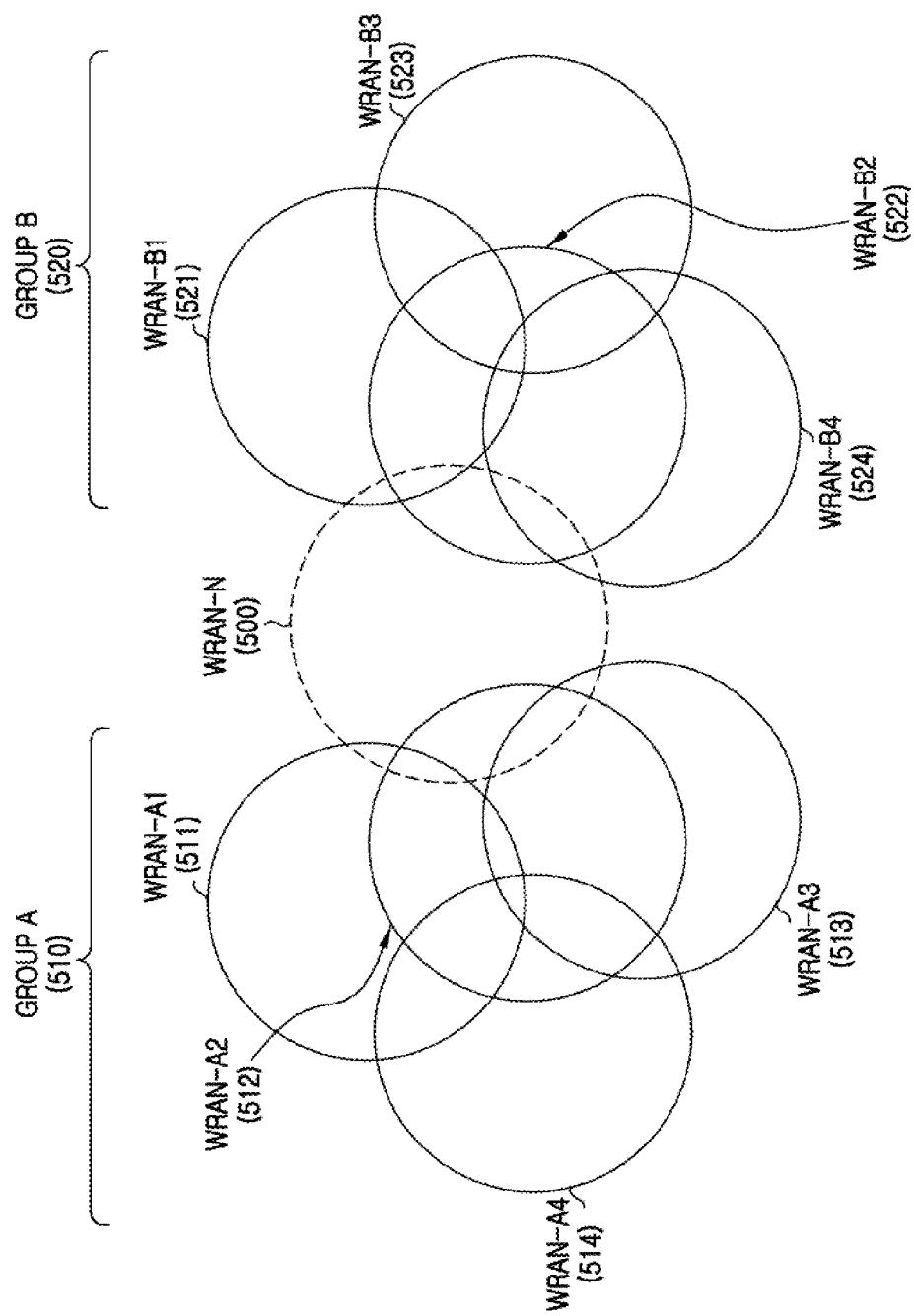
FIG. 5 illustrates an example of a newly accessing WRAN in a CR-based broadband wireless communication system according to an exemplary embodiment of the present invention.

In addition, an SCW slot can also be obtained according to an exemplary embodiment of the present invention in a situation illustrated in FIG. 5.

FIG. 5 illustrates an example of a newly accessing WRAN in a CR-based broadband wireless communication system according to an exemplary embodiment of the present invention.

As illustrated in FIG. 5, when two independent WRAN groups (i.e., a group-A 510 and a group-B 520) exist, a WRAN-N 500 newly accesses at a location affected by both the group-A 510 and the group-B 520.

Figure 6A:
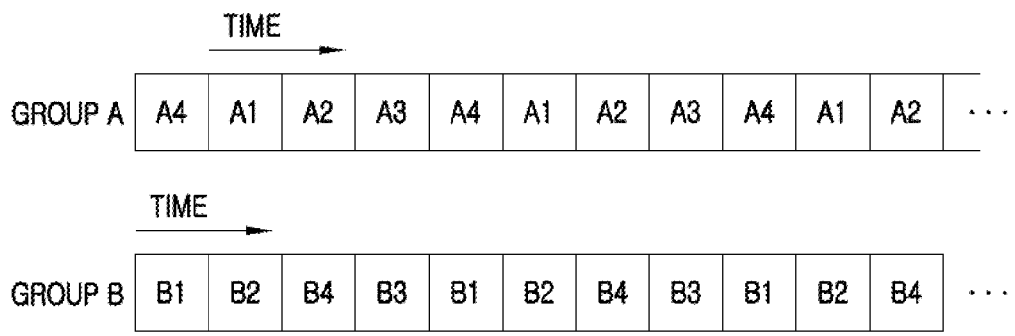
FIGS. 6A and 6B illustrate an example of a result of identifying neighbor WRANs by a newly accessing WRAN in a CR-based broadband wireless communication system according to an exemplary embodiment of the present invention.
Figure 6B:
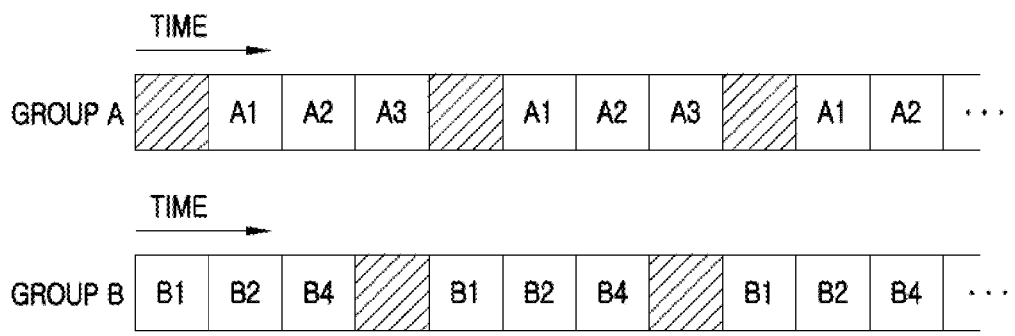

FIGS. 6A and 6B illustrate an example of a result of identifying neighbor WRANs by a newly accessing WRAN in a CR-based broadband wireless communication system according to an exemplary embodiment of the present invention. FIGS. 6A and 6B will be described in the context of the example described above with respect to FIG. 5.

A WRAN-A1 511, a WRAN-A2 512, a WRAN-A3 513, and a WRAN-A 4 514, which belong to the group-A 510, and a WRAN-B1 521, a WRAN-B2 522, a WRAN-B3 523, and a WRAN-B4 524, which belong to the group-B 520, are currently using an SCW of FIG. 6A in a channel A. However, an analysis result of the WRAN-N 500 is as illustrated in FIG. 6B. That is, due to a difference of geo-location distances, the WRAN-N 500 cannot receive a CBP packet from the WRAN-A4 514 and a CBP packet from the WRAN-B3 523. In this case, the same SCW slot can be used to simultaneously identify SCW regular patterns of different groups because UEs existing in different locations identify the respective groups. That is, among the UEs belonging to the WRAN-N 500, a UE adjacent to the group-A 510 identifies an SCW regular pattern of the group-A 510, and a UE adjacent to the group-B 520 identifies an SCW regular pattern of the group-B 520.

After identifying the SCW regular pattern of the group-A 510 and the group-B 520, the WRAN-N 500 selects a contender that can minimize contention. When the WRAN-N 500 obtains the SCW slot, it has an effect on both the group-A 510 and the group-B 520. Thus, the WRAN-N 500 selects the contender so that a vacant SCW slot is used by at least one group. When winning in the contention, the WRAN-N 500 configures an SCW usage pattern so that its SCW usage period is double that of an SCW usage period of the contender. A WRAN which has lost in the contention doubles its SCW usage period.

Now, a process of obtaining an SCW slot through contention will be described below in more detail with reference to FIG. 7.

Figure 7:
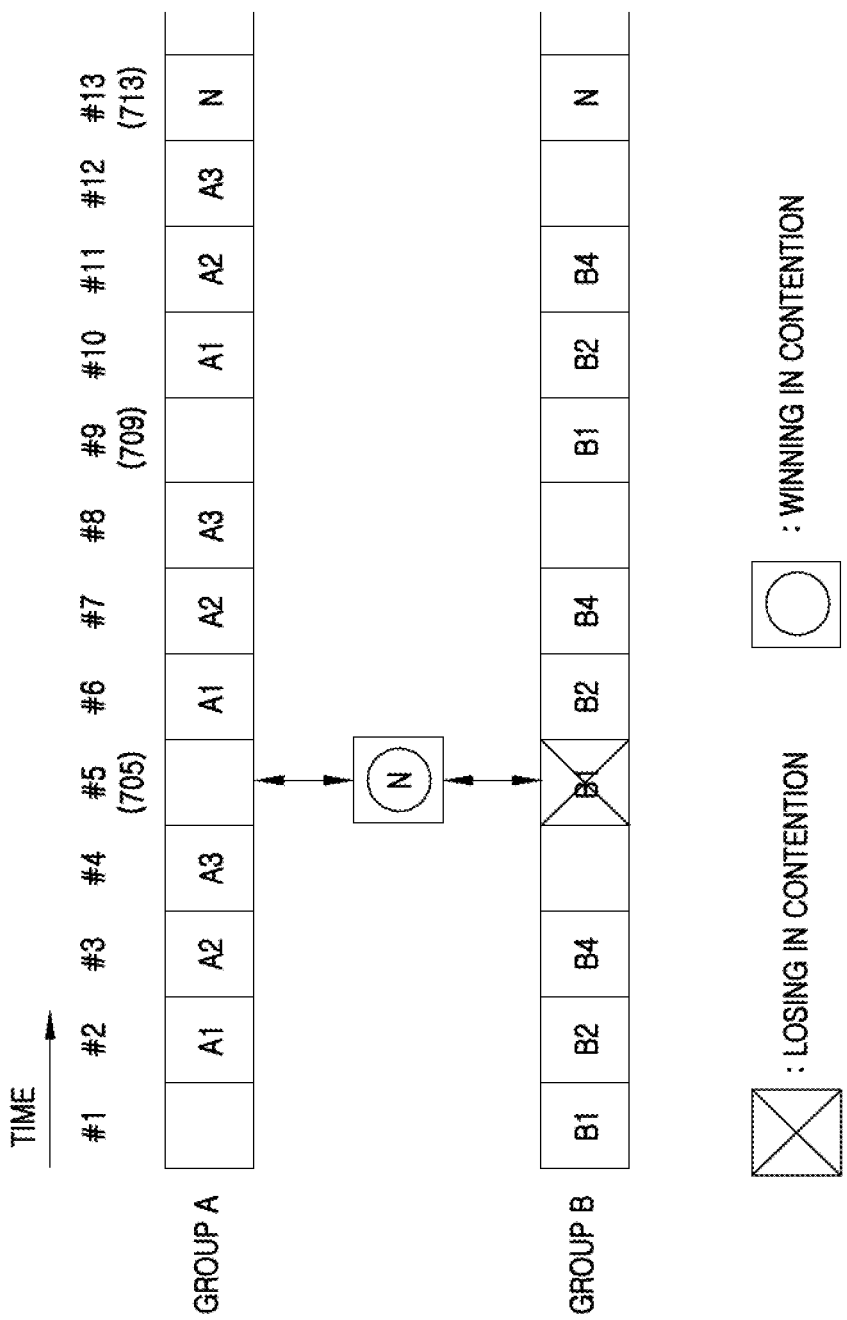
FIG. 7 illustrates an example of obtaining an SCW slot in a CR-based broadband wireless communication system according to an exemplary embodiment of the present invention.

FIG. 7 illustrates an example of obtaining an SCW slot in a CR-based broadband wireless communication system according to an exemplary embodiment of the present invention. FIG. 7 will be described in the context of the examples described above with respect to FIGS. 5, 6A and 6B.

As illustrated in FIG. 7, the WRAN-N 500 competes with the WRAN-B1 521 in an SCW slot #5 705. In this case, contention with the WRAN-B1 521 does not have an effect on the group-A 510. In this case, the WRAN-N 500 wins in the contention with the WRAN-B1 521 and thus uses the SCW slot #5 705 to transmit a CBP packet. Accordingly, the WRAN-B1 521 doubles the SCW usage period, and the WRAN-N 500 configures an SCW usage pattern so that its SCW usage period is double that of the previous SCW usage period of the WRAN-B1 521. In other words, the WRAN-N 500 and the WRAN-BL 521 set the SCW usage period to 8 SCW slots. Accordingly, for CBP packet transmission, the WRAN-N 500 uses an SCW slot #13 713, and the WRAN-B1 521 uses an SCW slot #9 709. Consequently, without having an effect on the group-A 510, the WRAN-N 500 and the WRAN-B1 521 share SCW slots occupied by the WRAN-B1 521.

In the aforementioned process of obtaining the SCW slot, a newly accessing WRAN performs contention, and determines whether it has won or lost in the contention. Descriptions of the contention, winning the contention, and losing the contention are provided below.

The WRAN sets a random backoff time before a CBP packet is transmitted. The random backoff time is a transmission delay time of the CBP packet. The WRAN transmits the CBP packet after the random backoff time elapses from a start time of an SCW slot. Therefore, even if two WRANs use one SCW slot to transmit CBP packets, the CBP packets are transmitted at different times. Further, the two WRANS can recognize a CBP packet transmitted by another WRAN. That is, when two WRANs use the same SCW slot to transmit CBP packets, it implies contention, when a CBP packet is first transmitted, it implies winning the contention, and when a CBP packet is transmitted by another WRAN, it implies losing the contention.

Figure 8:
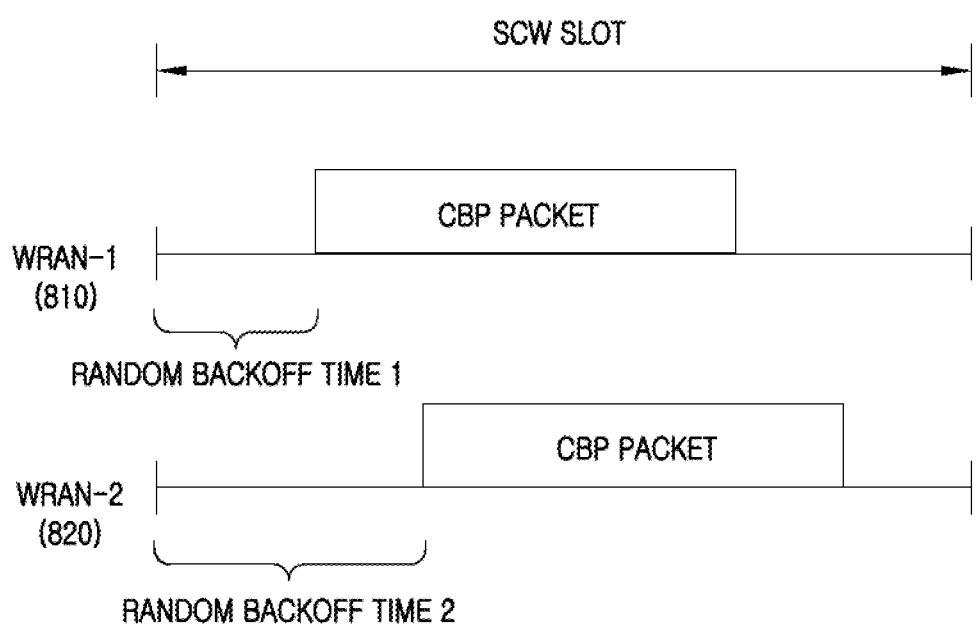
FIG. 8 illustrates an example of contention for an SCW slot in a CR-based broadband wireless communication system according to an exemplary embodiment of the present invention.

FIG. 8 illustrates an example of contention for an SCW slot in a CR-based broadband wireless communication system according to an exemplary embodiment of the present invention. FIG. 8 will be described in the context of the examples described above with respect to FIGS. 5, 6A, 6B and 7.

As illustrated in FIG. 8, if a random backoff time of a WRAN-1 810 is less than a random backoff time of a WRAN-2 820, the WRAN-1 810 transmits a CBP packet before the WRAN-2 820 transmits a CBP packet. Therefore, since the WRAN-1 810 fails to recognize CBP packet transmission caused by another WRAN prior to CBP packet transmission of the WRAN-1 810, the WRAN-1 810 determines that it has won in the contention. In addition, since the WRAN-2 820 recognizes CBP packet transmission caused by another WRAN prior to CBP packet transmission of the WRAN-2 820, the WRAN-2 820 determines it has lost the contention.

In addition to a case where a WRAN newly accesses as illustrated in FIG. 1 or FIG. 5, there may be a case where the WRAN is released. That is, when the WRAN moves to a channel with another frequency or when power is off, SCW slots occupied by the released WRAN are in a vacant state. In this case, the remaining WRANs can additionally use the vacant slots.

In the aforementioned process of obtaining the SCW slot, the newly accessing WRAN needs to first recognize an SCW regular pattern of neighbor WRANs. For this, the newly accessing WRAN has to monitor a CBP packet of the WRANs during several frames. When the SCW regular pattern is determined by monitoring the CBP packets transmitted on a channel, the newly accessing WRAN receives the CBP packet at least two times for each WRAN. That is, a monitoring time is at least a maximum value among CBP transmission periods of the neighbor WRANs.

Therefore, in order to decrease a time required to recognize the SCW regular pattern, each WRAN appends its SCW usage pattern information to a CBP packet. Accordingly, the newly accessing WRAN can know a SCW usage pattern of a corresponding WRAN even if only one CBP packet is received from each WRAN. For example, the SCW usage pattern information may be included in a beacon Media Access Control (MAC) header of the CBP packet or in a specific Information Element (IE). For example, the SCW usage pattern information is expressed in a type of either a pattern period or a location of an SCW slot in which a next CBP packet will be transmitted. In this case, the SCW usage pattern information can be expressed by Table 1 below.

TABLE 1

| Syntax | Size | Notes |
|---|---|---|
| Type indicator | 1 bit | 0: Type indicating the value of period<br>1: Type indicating the location of next SCW slot directly |
| Value | x bits | The value of a pattern period or the number of frames from the current slot to the slot in which a next CBP packet will be transmitted. |

In Table 1 above, a 'Type indicator' field indicates whether information is pattern information or location information of an SCW slot in which a next CBP packet will be transmitted, and according to a value of the 'Type indicator' field, a 'Value' field indicates a value of a pattern period or the number of remaining frames from a current slot to a slot in which a next CBP packet will be transmitted. Herein, x denotes the number of bits of the 'Value' field and may be determined by a maximum pattern period value.

Hereinafter, operations of a BS and a UE for obtaining an SCW slot described above will be explained in more detail with reference to the accompanying drawings. For convenience of explanation, entities for transmitting CBP packets, e.g., the BS and the UE, will be collectively referred as a 'CBP packet sender'.

Figure 9A:
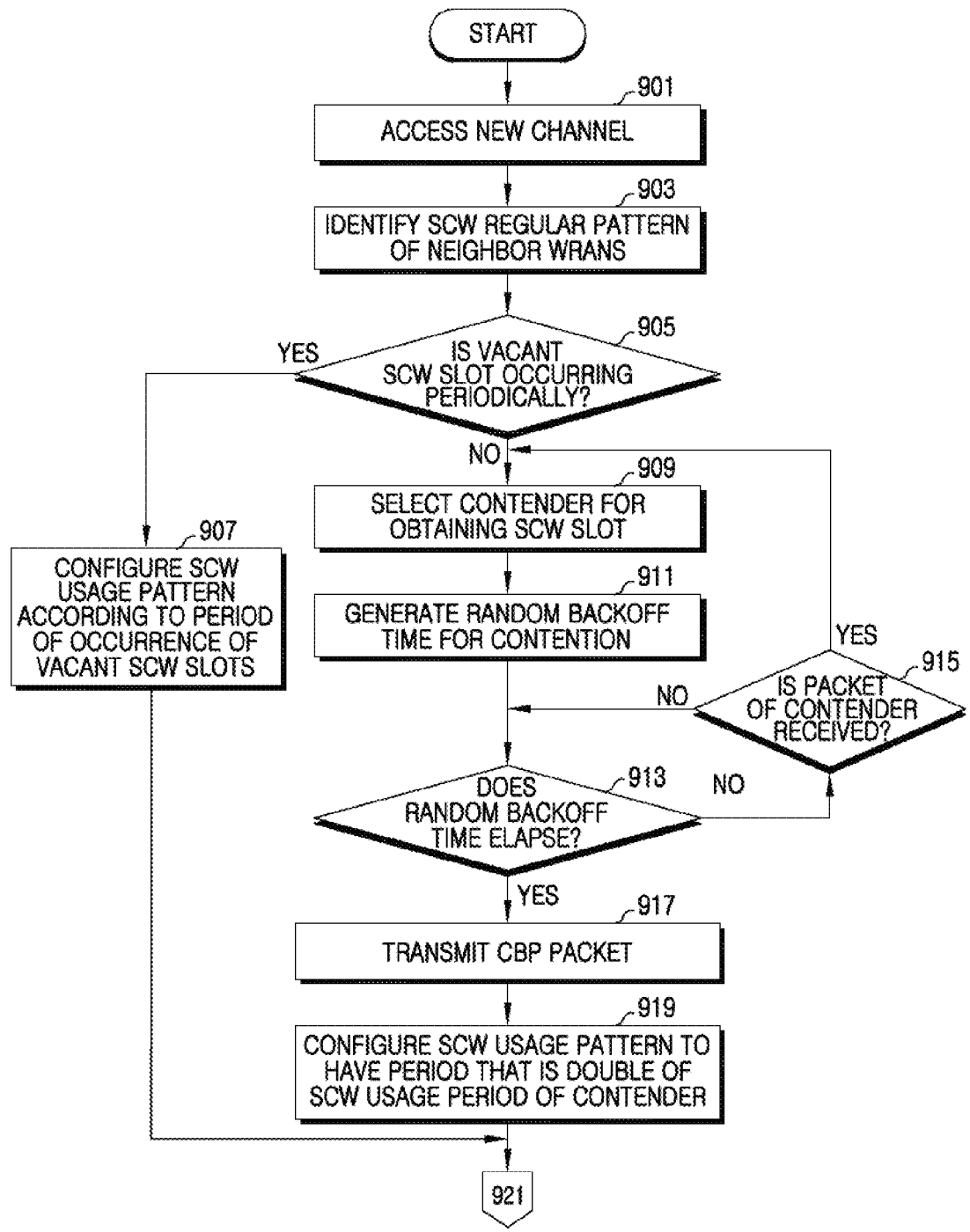
FIGS. 9A and 9B illustrate an operation of a CBP packet sender in a CR-based wireless communication system according to an exemplary embodiment of the present invention.
Figure 9B:
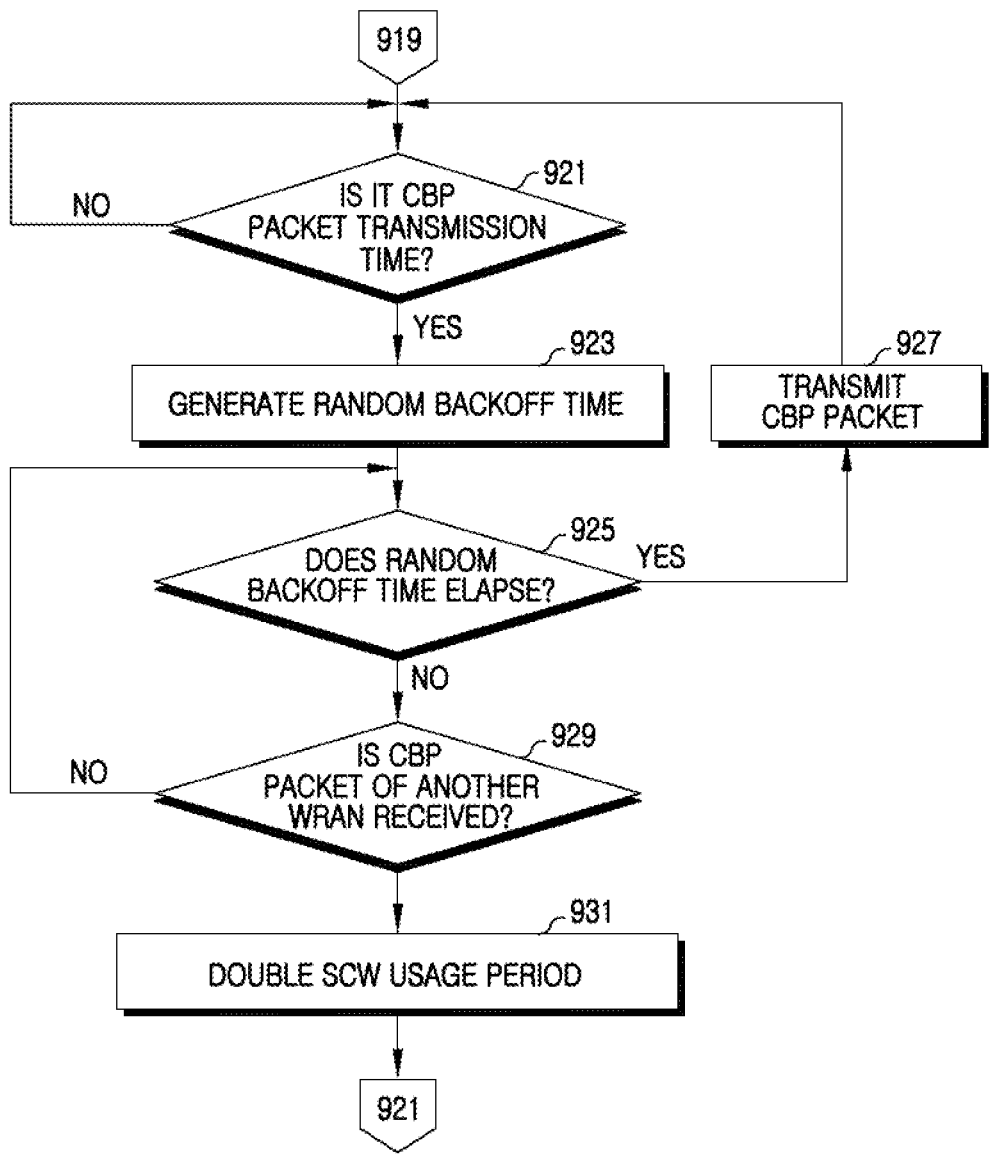

FIGS. 9A and 9B illustrate an operation of a CBP packet sender in a CR-based wireless communication system according to an exemplary embodiment of the present invention.

Referring to FIGS. 9A and 9B, the CBP packet sender accesses a new channel in step 901. For example, the CBP packet sender accesses the new channel by transitioning from a power-off state to a power-on state or by changing an operation channel according to a spectrum sensing result.

After accessing the new channel, proceeding to step 903, the CBP packet sender identifies an SCW regular pattern of neighbor WRANs. That is, the CBP packet sender receives a CBP packet for each SCW and evaluates a WRAN that transmits the CBP packet to recognize the SCW regular pattern of the neighbor WRANs. If the CBP packet sender is a UE, the UE reports an analysis result to a BS. Otherwise, if the CBP packet sender is the BS, the BS combines its analysis result with the analysis result reported from UEs. When the neighbor WRANs transmits their SCW usage pattern information by using the CBP packet, the CBP packet sender receives the CBP packet of the neighbor WRANs one time per each WRAN to evaluate each WRAN's SCW usage pattern, and determines the SCW regular pattern. For example, the SCW usage pattern included in the CBP packet is configured as shown in Table 1 above.

After identifying each WRAN's SCW regular pattern, proceeding to step 905, the CBP packet sender determines whether vacant SCW slots are periodically occurring. In other words, the CBP packet sender determines whether an SCW slot can be obtained without having an effect on other WRANs.

If the vacant SCW slots are periodically occurring, proceeding to step 907, the CBP packet sender configures its SCW usage pattern so that an occurrence period of the vacant SCW slot coincides with its SCW usage period. That is, the CBP packet sender configures its SCW usage pattern to be substantially identical to a pattern of generating the vacant SCW slot.

Otherwise, if the vacant SCW slot is not occurring periodically, proceeding to step 909, the CBP packet sender selects a contender for obtaining the SCW slot. In this case, the CBP packet sender selects a WRAN having a shortest SCW usage period as the contender. If different SCW regular patterns of a plurality of groups are identified and vacant SCW slots are periodically occurring in at least one SCW regular pattern, the CBP packet sender selects the contender to use a vacant SCW slot of at least one group.

After selecting the contender, proceeding to step 911, the CBP packet sender generates a random backoff time for contention. That is, when the contender starts its SCW for transmitting a CBP packet, the CBP packet sender generates the random backoff time.

Subsequently, proceeding to step 913, the CBP packet sender determines whether the random backoff time elapses. In other words, the CBP packet sender determines whether the random backoff time elapses from the start time of the SCW in which the contender transmits the CBP packet.

If the random backoff time does not elapse, proceeding to step 915, the CBP packet sender determines whether the CBP packet of the contender is received. That is, the CBP packet sender determines whether the CBP packet sender loses in the contention. If the CBP packet of the contender is received before the random backoff time elapses, the CBP packet sender recognizes that it lost the contention, and the procedure returns to step 909. In this case, the same contender may be reselected. Otherwise, if the CBP packet of the contender is not received, step 913 and step 915 are repeated so that the CBP packet sender determines whether the random backoff time elapses or whether the CBP packet of the contender is received.

If the determination result of step 913 is that the random backoff time elapses before the CBP packet of the contender is received, proceeding to step 917, the CBP packet sender transmits its CBP packet. The CBP packet includes a variety of information related to a self-coexistence algorithm, for example, a location of a corresponding BS, a sensing result, scheduling information, a backup channel list, etc. Further, the CBP packet may additionally include SCW usage pattern information of the CBP packet sender. For example, the SCW usage pattern included in the CBP packet may be configured as shown in Table 1 above.

After transmitting the CBP packet, proceeding to step 919, the CBP packet sender recognizes that it won the contention, and configures its SCW usage pattern so that its SCW usage period is double that of an SCW usage period of the contender. Accordingly, the CBP packet sender and the contender share the SCW slots.

Thereafter, proceeding to step 921 (in FIG. 9B), the CBP packet sender determines whether it is a CBP packet transmission time. That is, the CBP packet sender determines whether a time corresponding to the SCW usage period elapses from a previous CBP packet transmission.

If it is the CBP packet transmission time, proceeding to step 923, the CBP packet sender generates a random backoff time. That is, the CBP packet sender determines a specific time delay after which the CBP packet will be transmitted from the SCW start time.

Thereafter, proceeding to step 925, the CBP packet sender determines whether the random backoff time elapses from the SCW start time.

If the random backoff time elapses, proceeding to step 927, the CBP packet sender transmits its CBP packet, and the procedure returns to step 921. The CBP packet includes a variety of information related to a self-coexistence algorithm, for example, a location of a corresponding BS, a sensing result, scheduling information, a backup channel list, etc. Further, the CBP packet may additionally include SCW usage pattern information of the CBP packet sender. For example, the SCW usage pattern included in the CBP packet may be configured as shown in Table 1 above.

Otherwise, if the random backoff time does not elapse, proceeding to step 929, the CBP packet sender determines whether a CBP packet of a different WRAN is received. If the CBP packet of the different WRAN is not received, step 925 and step 929 are repeated so that the CBP packet sender determines whether the random backoff time elapses or whether the CBP packet of the different WRAN is received.

If the CBP packet of the different WRAN is received before the random backoff time elapses, proceeding to step 931, the CBP packet sender recognizes that it lost the contention and doubles a current SCW usage period. Thereafter, returning to step 921, the CBP packet sender determines whether it is the CBP packet transmission time according to a newly configured SCW usage pattern.

Figure 10:
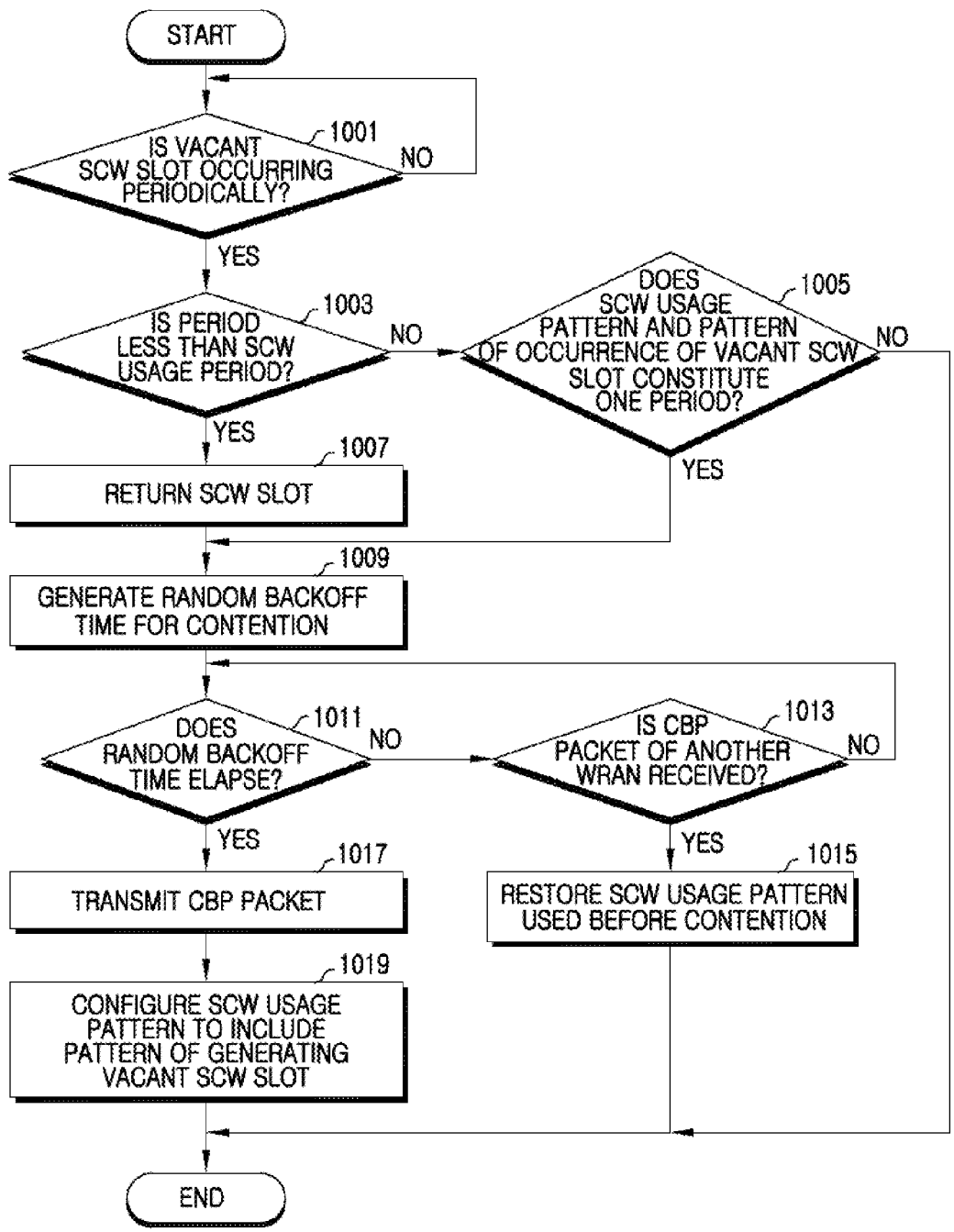
FIG. 10 is a flowchart illustrating an operation of a CBP packet sender when a neighbor WRAN is released in a CR-based wireless communication system according to an exemplary embodiment of the present invention.

FIG. 10 is a flowchart illustrating an operation of a CBP packet sender when a neighbor WRAN is released in a CR-based wireless communication system according to an exemplary embodiment of the present invention. The operation of FIG. 10 is an operation of a CBP packet sender that currently occupies SCW slots. That is, the operation of FIG. 10 is a subsequent operation to the operations of FIG. 9A and FIG. 9B, and is performed exclusively from subsequent steps of step 921 in the operations of FIG. 9A and FIG. 9B.

Referring to FIG. 10, the CBP packet sender determines whether vacant SCW slots are periodically occurring in step 1001. The periodic vacant SCW slot occurs when a WRAN is released or when a different WRAN occupies SCW slots occupied by the released WRAN.

If the vacant SCW slots are periodically occurring, proceeding to step 1003, the CBP packet sender determines whether an occurrence period of the vacant SCW slot is less than its SCW usage period. That is, the CBP packet sender determines whether its SCW usage period can be shortened by occupying the vacant SCW slot.

If the occurrence period of the vacant SCW slot is less than its SCW usage period, proceeding to step 1007, the CBP packet sender determines to attempt contention for occupying the vacant SCW slot and returns its SCW slots. In other words, the CBP packet sender determines that there is no available SCW slot. Then, the procedure proceeds to step 1009.

Otherwise, if the occurrence period of the vacant SCW slot is greater than or equal to its SCW usage period, proceeding to step 1005, the CBP packet sender determines whether combination of its SCW usage pattern and a pattern of generating the vacant SCW slot constitute one period. That is, the CBP packet sender determines whether a location where the vacant SCW slot is occurring is located in a center of the SCW slots occupied by the CBP packet sender. If the combination of its SCW usage period and the period of the vacant SCW slot does not constitute one period, the procedure of FIG. 10 ends.

Otherwise, if the combination of its SCW usage period and the period of the vacant SCW slot constitutes one period, proceeding to step 1009, the CBP packet sender generates a random backoff time for contention. That is, when the vacant SCW slot starts, the CBP packet sender generates the random backoff time.

Subsequently, proceeding to step 1011, the CBP packet sender determines whether the random backoff time elapses. In other words, the CBP packet sender determines whether the random backoff time elapses from a start time of the vacant SCW slot.

If the random backoff time does not elapse, proceeding to step 1013, the CBP packet sender determines whether a CBP packet of a different WRAN is received. That is, the CBP packet sender determines whether the CBP packet sender lost the contention. Otherwise, if the CBP packet of the contender is not received, step 1011 and step 1013 are repeated so that the CBP packet sender determines whether the random backoff time elapses or whether the CBP packet of the contender is received.

If the determination of step 1013 shows that the CBP packet of the contender is received before the random backoff time elapses, proceeding to step 1015, the CBP packet sender recognizes that it lost the contention, and determines an SCW usage pattern used before contention as its SCW usage pattern. That is, the CBP packet sender restores the SCW usage pattern used before contention.

If the determination result of step 1011 shows that the random backoff time elapses before the CBP packet of the contender is received, proceeding to step 1017, the CBP packet sender transmits its CBP packet. The CBP packet includes a variety of information related to a self-coexistence algorithm, for example, a location of a corresponding BS, a sensing result, scheduling information, a backup channel list, etc. Further, the CBP packet may additionally include SCW usage pattern information of the CBP packet sender. For example, the SCW usage pattern included in the CBP packet may be configured as shown in Table 1 above.

After transmitting the CBP packet, proceeding to step 1019, the CBP packet sender recognizes that it won the contention, and configures its SCW usage pattern to include a pattern of generating the vacant SCW slot. In this case, if step 1005 has been performed, the CBP packet sender configures its SCW generation pattern to be identical to a pattern of generating the vacant SCW slot. Otherwise, if step 1005 has not been performed, the CBP packet sender configures a pattern, in which its SCW usage pattern and the pattern of generating the vacant SCW slot are combined, as a new SCW usage pattern.

Figure 11:
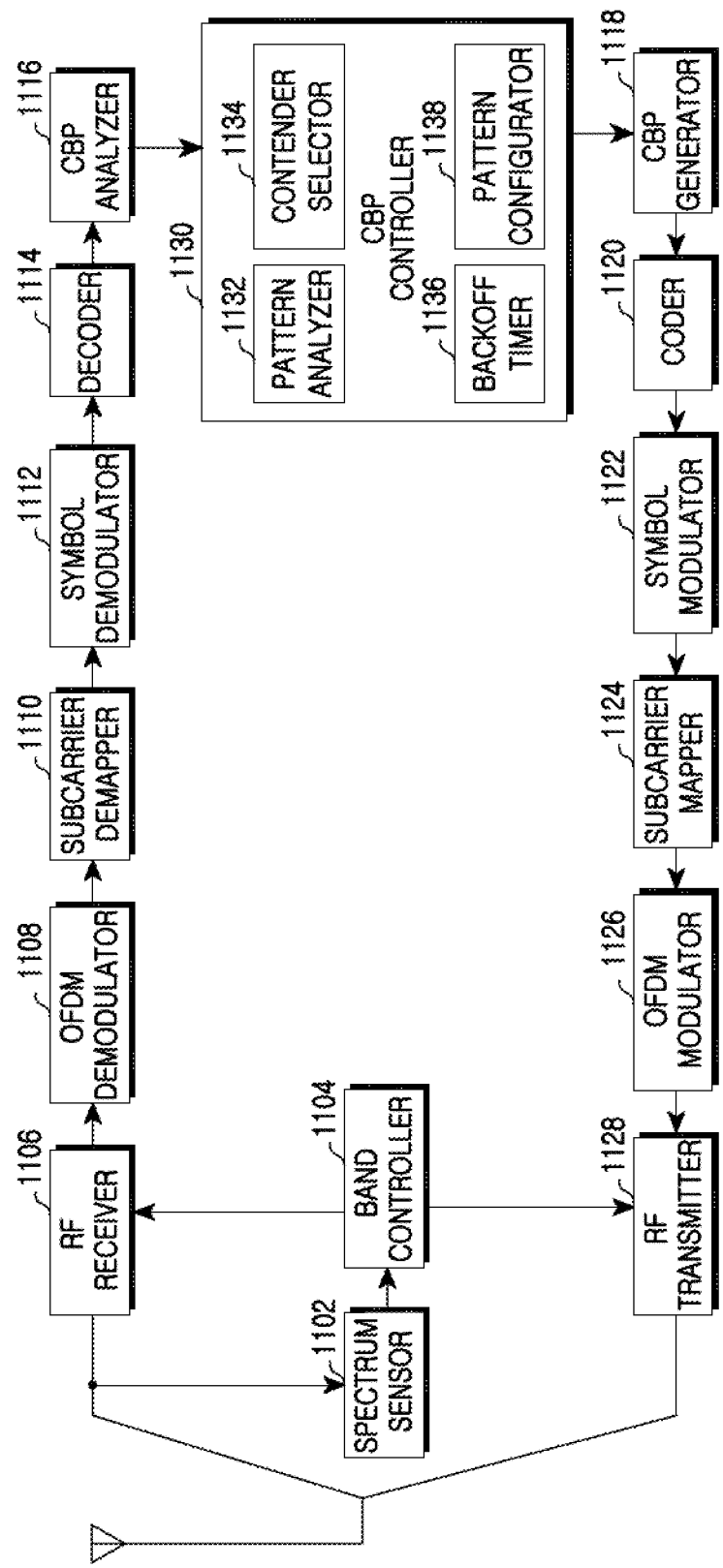
FIG. 11 is a block diagram illustrating a structure of a CBP packet sender in a CR-based wireless communication system according to an exemplary embodiment of the present invention.

FIG. 11 is a block diagram illustrating a structure of a CBP packet sender in a CR-based wireless communication system according to an exemplary embodiment of the present invention.

Referring to FIG. 11, the CBP packet sender includes a spectrum sensor 1102, a band controller 1104, a Radio Frequency (RF) receiver 1106, an OFDM demodulator 1108, a subcarrier demapper 1110, a symbol demodulator 1112, a decoder 1114, a CBP analyzer 1116, a CBP generator 1118, a coder 1120, a symbol modulator 1122, a subcarrier mapper 1124, an OFDM modulator 1126, an RF transmitter 1128, and a CBP controller 1130.

The spectrum sensor 1102 searches for a signal of a licensed system. The spectrum sensor 1102 evaluates a band usage state of the licensed system to search for a channel which is not used by the licensed system. The spectrum sensor 1102 provides a sensing result to the band controller 1104.

The band controller 1104 selects an operation channel according to the sensing result of the spectrum sensor 1102, and controls a processing band of the RF receiver 1106 and the RF transmitter 1128 to transmit and receive a signal with a band corresponding to the selected channel. That is, the band controller 1104 provides control to access the channel which is not used by the licensed system.

The RF receiver 1106 down-converts an RF-band signal received through an antenna into a baseband signal. The OFDM demodulator 1108 divides the baseband signal for each OFDM symbol, removes a Cyclic Prefix (CP), and then recovers frequency-band signals by performing a Fast Fourier Transform (FFT) operation. The subcarrier demapper 1110 divides the frequency-band signals for each processing. For example, the subcarrier demapper 1110 extracts a CBP packet received using an SCW slot. The symbol demodulator 1112 demodulates the signals to convert them into a bit-stream. The decoder 1114 decodes the bit-stream.

The CBP analyzer 1116 analyzes a CBP packet received from a neighbor WRAN. That is, the CBP analyzer 1116 evaluates the WRAN that transmits the CBP packet and information related to a self-coexistence algorithm for the WRAN that transmits the CBP packet. In particular, if WRANs transmit their SCW usage pattern information by using the CBP packet, the CBP analyzer 1116 determines an SCW usage pattern of the WRAN that transmits the CBP packet by analyzing the CBP packet and then provides the evaluated SCW usage pattern to the CBP controller 1130. For example, the SCW usage pattern included in the CBP packet may be configured as shown in Table 1 above.

The CBP generator 1118 generates a CBP packet to be transmitted. The CBP packet includes a variety of information related to a self-coexistence algorithm, for example, a location of a corresponding BS, a sensing result, scheduling information, a backup channel list, etc. Further, the CBP packet may additionally include SCW usage pattern information of the CBP packet sender. For example, the SCW usage pattern included in the CBP packet may be configured as shown in Table 1 above. In this case, the CBP generator 1118 transmits the CBP packet under the control of the CBP controller 1130.

The coder 1120 codes a bit-stream of the CBP packet. The symbol modulator 1122 modulates the bit-stream to convert it into complex symbols. The subcarrier mapper 1124 maps the complex symbols to a frequency domain. The OFDM modulator 1126 converts signals mapped to the frequency domain into a time-domain signal by performing an Inverse Fast Fourier Transform (IFFT) operation, inserts a CP, and thus configures baseband OFDM symbols. The RF transmitter 1128 up-converts the baseband OFDM symbols into an RF-band signal, and transmits the RF-band signal through an antenna.

The CBP controller 1130 provides control related to CBP transmission. That is, the CBP controller 1130 controls a function of obtaining an SCW slot at a time of channel accessing, a function of CBP packet transmission, etc. For this, the CBP controller 1130 includes a pattern analyzer 1132, a contender selector 1134, a backoff timer 1136, and a pattern configurator 1138.

The pattern analyzer 1132 analyzes an SCW regular pattern of neighbor WRANs by using CBP packets identified by the CBP analyzer 1116. That is, the pattern analyzer 1132 determines an SCW usage period and an SCW regular pattern of neighbor WRANs by using information of a WRAN that transmits a CBP packet received in every SCW and provided from the CBP analyzer 1116. If the neighbor WRANs transmit their SCW usage pattern information by using the CBP packet, the pattern analyzer 1132 determines each neighbor WRAN's SCW usage pattern determined by the CBP analyzer 1116, and recognizes the SCW regular pattern. For example, the SCW usage pattern included in the CBP packet may be configured as shown in Table 1 above.

If an analysis result of the pattern analyzer 1132 shows that the vacant SCW slot does not exist, the contender selector 1134 selects a contender for obtaining an SCW slot. In this case, the contender selector 1134 selects a WRAN having a shortest SCW usage period as the contender. In addition, if different SCW regular patterns of a plurality of groups are identified and vacant SCW slots are periodically occurring in at least one SCW regular pattern, the contender selector 1134 selects the contender to use a vacant SCW slot of at least one group. Further, the contender selector 1134 reports to the backoff timer 1136 a start time of the SCW slot in which the selected contender transmits the CBP packet.

When the CBP packet is transmitted and when contention is performed to obtain the SCW slot, the backoff timer 1136 generates a random backoff time and determines whether the random backoff time elapses. That is, when contention is performed to obtain the SCW slot, the backoff timer 1136 generates the random backoff time at a start time of the SCW slot in which the contender transmits the CBP packet, and determines whether the random backoff time elapses. After the SCW slot is obtained, the backoff timer 1136 generates the random backoff time at the start time of the SCW slot in which the CBP packet is transmitted according to the SCW usage pattern determined by the pattern configurator 1138, and determines whether the random backoff time elapses.

The pattern configurator 1138 configures the SCW usage pattern. If contention is unnecessary, the pattern configurator 1138 configures the SCW usage pattern according to a period of the vacant SCW slot. Otherwise, if contention is necessary, when winning the contention for obtaining the SCW slot with the contender, the pattern configurator 1138 configures the SCW usage pattern so that its SCW usage pattern is double that of the SCW usage period of the contender. After winning the contention, when losing the contention with a different WRAN, the pattern configurator 1138 doubles the SCW usage period. Further, the pattern configurator 1138 reports to the backoff timer 1136 the start time of the SCW slot in which the CBP packet is transmitted according to the determined SCW usage pattern.

That is, the CBP controller 1130 controls the pattern analyzer 1132 to analyze an SCW regular pattern of neighbor WRANs, controls the contender selector 1134 to select the contender, controls the backoff timer 1136 to generate the random backoff time, and controls the pattern configurator 1138 to configure the SCW usage pattern. In this case, the process of configuring the SCW usage pattern is performed by differentiating a case where the CBP packet sender newly accesses a channel and a case where a vacant SCW slot is occurring after accessing the channel.

First, when the CBP packet sender newly accesses the channel, the pattern analyzer 1132, the contender selector 1134, the backoff timer 1136, and the pattern configurator 1138 inter-operate to obtain an SCW slot and to transmit a CBP packet, as described below.

Upon accessing the new channel by operations of the spectrum sensor 1102 and the band controller 1104, the CBP controller 1130 controls the pattern analyzer 1132 to analyze an SCW regular pattern of neighbor WRANs. If the CBP packet sender is a UE, the CBP controller 1130 reports the analysis result to a BS. That is, although not shown, the UE further includes a message generator which generates a message for reporting the analysis result provided from the CBP controller 1130. Otherwise, if the CBP packet sender is the BS, the CBP controller 1130 combines its analysis result with the analysis result reported from UEs. That is, although not shown, the BS further includes a message analyzer which evaluates an analysis result reported from the UEs by using a message received from the UEs and which provides the analysis result to the CBP controller 1130. If WRANs transmit their SCW usage pattern information by using the CBP packet, the CBP controller 1130 evaluates an SCW usage pattern of a WRAN that transmits the CBP packet by analyzing the CBP packet, and analyzes the evaluated SCW usage pattern.

If the result obtained by identifying the SCW regular pattern shows that the vacant SCW slots are periodically occurred, the CBP controller 1130 controls the pattern configurator 1138 to configure the SCW usage pattern so that a period of the vacant SCW slot coincides with its SCW usage period. Otherwise, if the vacant SCW slot is not periodically occurring, the CBP controller 1130 controls the contender selector 1134 to select a contender for obtaining the SCW slot and controls the backoff timer 1136 to generate a random backoff time for contention.

Thereafter, if the CBP packet of the contender is received before the random backoff time elapses from a start time of an SCW slot in which the contender transmits the CBP packet, the CBP controller 1130 recognizes that it lost the contention and thus controls the contender selector 1134 to reselect the contender. In this case, the same contender may be reselected. Otherwise, if the CBP packet of the contender is not received before the random backoff time elapses from a start time of an SCW slot in which the contender transmits the CBP packet, the CBP controller 1130 controls the CBP generator 1118 to output a CBP packet. Accordingly, the CBP controller 1130 recognizes that it won the contention and thus controls the pattern configurator 1138 to configure an SCW usage pattern so that its SCW usage period is double that of the SCW usage period of the contender. As a result, the CBP packet sender and the contender share the SCW slots.

Thereafter, when a CBP packet transmission time has arrived according to the determined SCW usage pattern, the CBP controller 1130 controls the backoff timer 1136 to generate a random backoff time. When the random backoff time elapses, the CBP controller 1130 instructs the CBP generator 1118 to output a CBP packet. In this case, if a CBP packet of a different WRAN is received before the random backoff time elapses, the CBP controller 1130 recognizes that it lost the contention and thus controls the pattern configurator 1138 to double a current SCW usage period.

Next, in a case where a vacant SCW slot is occurring when a WRAN is released from a channel or when a different WRAN occupies SCW slots occupied by the released WRAN, the pattern analyzer 1132, the contender selector 1134, the backoff timer 1136, and the pattern configurator 1138 inter-operate to obtain an SCW slot and to transmit a CBP packet, as described below.

In a state where SCW slots are periodically occupied, the CBP controller 1130 controls the pattern analyzer 1132 to persistently analyze an SCW regular pattern. If the CBP packet sender is a UE, the CBP controller 1130 reports the analysis result to a BS. That is, although not shown, the UE further includes a message generator which generates a message for reporting the analysis result provided from the CBP controller 1130. Otherwise, if the CBP packet sender is the BS, the CBP controller 1130 combines its analysis result with the analysis result reported from UEs. That is, although not shown, the BS further includes a message analyzer which evaluates an analysis result reported from the UEs by using a message received from the UEs and which provides the analysis result to the CBP controller 1130.

If the result obtained by identifying the SCW regular pattern shows that the vacant SCW slots are periodically occurring, the CBP controller 1130 determines whether an occurrence period of the vacant SCW slot is less than its SCW usage period. If the occurrence period of the vacant SCW slot is less than its SCW usage period, the CBP controller 1130 determines to change its SCW usage period to the occurrence period of the vacant SCW slot by performing contention for occupying the vacant SCW slot, and restores its SCW slots. Otherwise, if the occurrence period of the vacant SCW slot is greater than or equal to its SCW usage period, the CBP controller 1130 determines whether combination of its SCW usage pattern and a pattern of generating the vacant SCW slot constitutes one period. If the determination result shows that the combination of its SCW usage pattern and the pattern of generating the vacant SCW slot constitutes one period, the CBP controller 1130 determines to use not only currently occupied SCW slots but also the vacant SCW slots. In this case, the SCW slots are not returned.

Subsequently, the CBP controller 1130 controls the backoff timer 1136 to generate a random backoff time for contention. Thereafter, if the CBP packet of the contender is received before the random backoff time elapses from the start time of the vacant SCW slot, the CBP controller 1130 recognizes that it lost the contention and restores an SCW usage period used before the contention. Otherwise, if the CBP packet of the contender is not received before the random backoff time elapses from the start time of the vacant SCW slot, the CBP controller 1130 controls the CBP generator 1118 to output a CBP packet. Accordingly, the CBP controller 1130 recognizes that it won the contention and thus controls the pattern configurator 1138 to configure its SCW usage pattern to include a pattern of generating the vacant SCW slot. If SCW slots have been returned in this case, the CBP controller 1130 configures its SCW usage pattern to be identical to the pattern of generating the vacant SCW slot. Otherwise, if the SCW slots have not been returned, the CBP controller 1130 determines the combination of its SCW usage pattern and the pattern of generating the vacant SCW slot as a new SCW usage pattern.

According to exemplary embodiments of the present invention, in a CR-based wireless communication system, a proper contender is selected by analyzing neighbor WRANs, and a WRAN that loses the contention increases an SCW usage period. Therefore, a highly reliable SCW regular pattern can be configured while avoiding collision among CBP packets.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a transmitter in a wireless communication system, the method comprising:
    transmitting, by the transmitter, a coexistence beacon protocol (CBP) packet in a frame among frames that include self-coexistence window (SCW) slots occupied by the transmitter to transmit CBP packets; and
    transmitting, by the transmitter, a next CBP packet in another frame among the frames that include the SCW slots occupied by the transmitter to transmit the CBP packets,
    wherein the CBP packet comprises usage pattern information indicating a location of the another frame in which the next CBP packet is to be transmitted among the frames by SCW cycle length.

2. The method of claim 1, wherein the usage pattern information comprises at least one of a first parameter which indicates a type of the usage pattern information and a second parameter indicating the frames in form of the type.

3. The method of claim 1, wherein the usage pattern information comprises a number of frames from the frame to the other frame.

4. The method of claim 1, wherein the usage pattern information indicates the other frame where the next CBP packet is transmitted.

5. The method of claim 1, wherein the usage pattern information comprises a periodicity for transmitting the CBP packets.

6. The method of claim 1, further comprising:
    receiving a CBP packet from neighbor Wireless Regional Area Networks (WRANs).

7. The method of claim 6, further comprising:
    selecting a WRAN as a contender among the neighbor WRANs;
    performing a contention for transmitting the CBP packets with the contender within SCW slots that are occupied by the WRAN; and
    determining the SCW slots so that an SCW usage period of the CBP packet sender is double that of an SCW usage period of the contender when the contention is won.

8. The method of claim 7, wherein the selecting of the WRAN as the contender comprises selecting a WRAN having a shortest SCW usage period as the contender among the neighbor WRANs.

9. The method of claim 7, wherein the selecting of the contender comprises, if different SCW regular patterns of a plurality of groups are identified and vacant SCW slots are periodically occurring in at least one of the SCW regular patterns, selecting the contender to use a vacant SCW slot of at least one of the groups.

10. The method of claim 7, further comprising:
    after determining the SCW slots, doubling the SCW usage period when a contention for transmitting the CBP packet with another WRAN is lost.

11. The method of claim 3, further comprising:
    if vacant SCW slots are periodically occurring, determining the SCW slots to transmit the CBP packets within the vacant SCW slots; and
    if the vacant SCW slots are not periodically occurring, performing a contention to occupy the SCW slots to transmit the CBP packets.

12. An apparatus for transmitting coexistence beacon protocol (CBP) packets in a Cognitive Radio (CR)-based wireless communication system, the apparatus comprising:
    a transmitter configured to:
        transmit a CBP packet in a frame among frames that include self-coexistence window (SCW) slots occupied by the transmitter to transmit CBP packets, and
        transmit a next CBP packet in another frame among the frames that include the SCW slots occupied by the transmitter to transmit the CBP packets; and
    a hardware controller coupled to the transmitter,
        wherein the CBP packet comprises usage pattern information indicating a location of the another frame in which the next CBP packet is to be transmitted among the frames by SCW cycle length.

13. The apparatus of claim 12, wherein the usage pattern information comprises at least one of a first parameter which indicates a type of the usage pattern information and a second parameter indicating the frames in form of the type.

14. The apparatus of claim 12, wherein the usage pattern information comprises a number of frames from the frame to the other frame.

15. The apparatus of claim 12, wherein the usage pattern information indicates the other frame where the next CBP packet is transmitted.

16. The apparatus of claim 12, wherein the usage pattern information comprises a periodicity for transmitting the CBP packets.

17. The apparatus of claim 12, wherein the controller monitors SCW usage patterns of neighbor Wireless Regional Area Networks (WRANs).

18. The apparatus of claim 17, wherein the controller selects a WRAN as a contender among the neighbor WRANs, performs a contention for transmitting the CBP packets with the contender within SCW slots that are occupied by the WRAN, and determines the SCW slots so that an SCW usage period of the CBP packet sender is double that of an SCW usage period of the contender when winning in the contention.

19. The apparatus of claim 18, wherein the selector selects a WRAN having a shortest SCW usage period as the contender among the neighbor WRANs.

20. The apparatus of claim 18, wherein the selector, if different SCW regular patterns of a plurality of groups are identified and vacant SCW slots are periodically occurring in at least one of the SCW regular patterns, selects the contender to use a vacant SCW slot of at least one of the groups.

21. The apparatus of claim 18, wherein the controller, after determining the SCW slots, doubles the SCW usage period when a contention for transmitting the CBP packet with another WRAN is lost.

22. The apparatus of claim 17, wherein the controller determines the SCW slots to transmit the CBP packets within vacant SCW slots if the vacant SCW slots are periodically occurring, and, performs a contention to occupy the SCW slots to transmit the CBP packets if the vacant SCW slots are not periodically occurring.

* * * * *